Jan 6, 1931. C. E. STROBURG ET AL 1,787,800
CORNER PLOW
Filed June 24, 1929
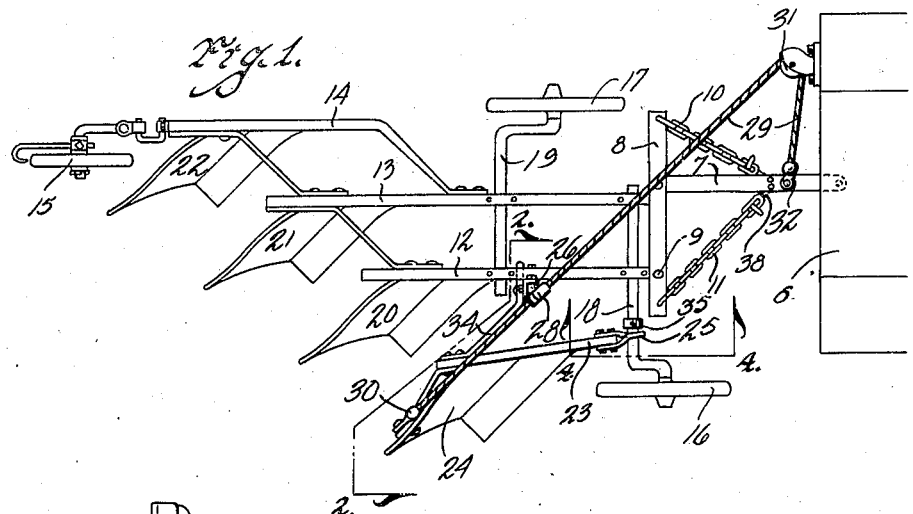
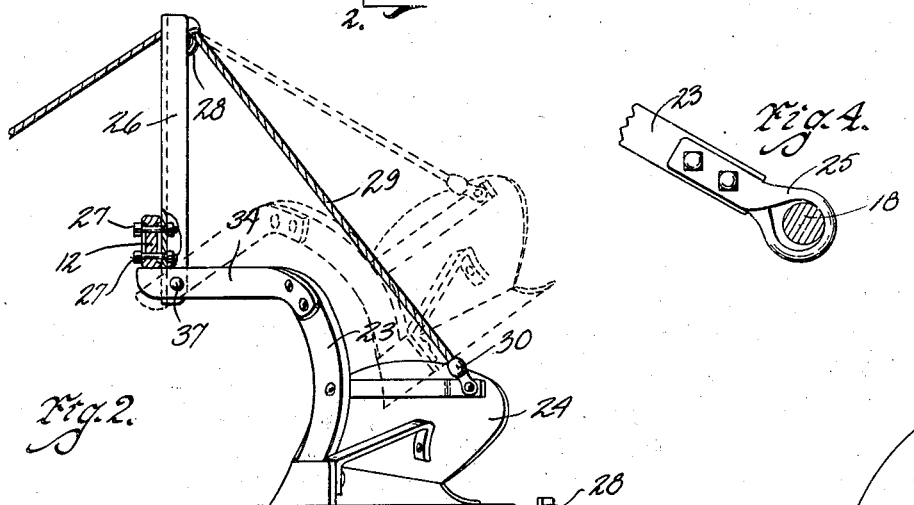
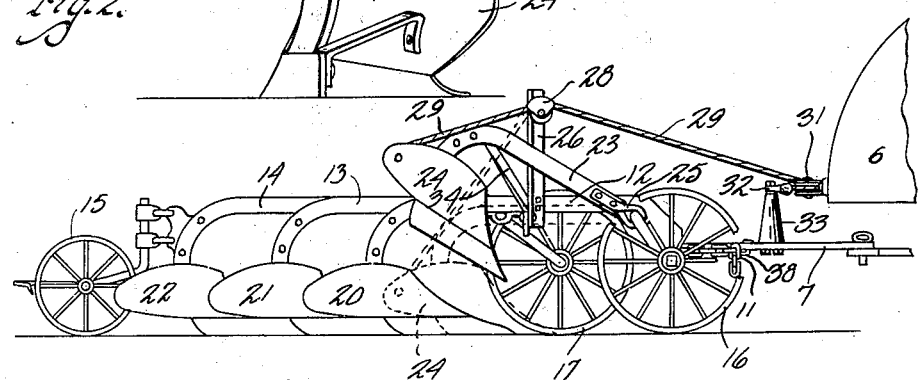
Inventors
Clark E. Stroburg
& Glen O. Stroburg
By Bair, Freeman & Sinclair
Attorneys
Witness
Linton Read Patented Jan. 6, 1931

1,787,800

UNITED STATES PATENT OFFICE

CLARK EMIL STROBURG AND GLEN ORTA STROBURG, OF BLOCKTON, IOWA

CORNER PLOW

Application filed June 24, 1929. Serial No. 373,272.

The object of this invention is to provide a supplemental plow attachment for gang plows to facilitate the plowing of corners of fields, particularly in the use of tractor-drawn plows.

Still another object of the invention is to provide a corner plow attachment which is automatically raised and maintained in inoperative position while the machine is following a straightaway course of travel and which is automatically lowered to operative position during the turning of a corner.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:

Figure 1 is a plan view showing a tractor-drawn gang plow equipped with our improved corner plow attachment.

Figure 2 is a rear view of the corner plow attachment on the line 2—2 of Figure 1, the dotted lines showing the corner plow in elevated position.

Figure 3 is a side elevation of the machine, the dotted lines showing the corner plow in operative position.

Figure 4 is a detail section on the line 4—4 of Figure 1.

In the accompanying drawing we have used the numeral 6 to designate generally a tractor which is provided with a hitch device for drawing a machine such as a gang plow or the like.

The hitch device includes a draw bar 7 having a cross-head 8 pivoted to its rear end, and adapted to be pivotally attached near one end, at the point 9 to the follower machine. In addition, the draw bar 7 is also preferably connected to the ends of the cross-head 8 by means of chains or the like, designated as 10 and 11.

The frame of the gang plow includes plow beams 12, 13 and 14 supported by a caster wheel 15, and by other wheels 16 and 17 mounted for rotation on separate drop axles 18 and 19. The plow beams 12, 13 and 14 carry plow bottoms 20, 21 and 22 respectively.

The corner plow attachment preferably is mounted at the right hand side of the gang plow and it includes a plow beam 23 which carries at its rear end a plow bottom 24, and which is pivoted at its forward end on a horizontal portion of the drop axle 18. The corner plow may be of any desired construction, either disk or mold-board type.

At its forward end the plow beam 23 carries a loop or eye 25 which loosely embraces the axle 18. This loose engagement permits the corner plow to tip or twist as it is raised.

A standard 26 is fixed to and rises from the gang plow frame, preferably being attached as by bolts 27 to the plow beam 12 adjacent the corner plow attachment. The standard 26 extends somewhat below the plane of the beam 12 as shown in Figure 2, and it carries at its upper end a pulley 28.

A flexible member 29, such as a rope, cable or chain, is attached at one end to the corner plow bottom 24 as by means of a rope clamp 30.

The flexible member 29 extends over the pulley 28 and also around a horizontally arranged pulley 31 carried by the rear portion of the tractor 6 at the left hand side thereof. The other end of the flexible member 29 is attached to the draw bar 7 by means of a clip 32 which may be carried by a post 33 to elevate it to substantially the same horizontal plane as the pulley 31.

It will thus be seen that the flexible member 29 extends upwardly, laterally and forwardly from the corner plow 24 over the pulley 28 to the pulley 31 and thence laterally to its point of attachment to the hitch device.

The length of the flexible connecting member 29 between its two points of attachment is such that it does not permit the pivoted corner plow to be lowered to operative position during such time as the tractor and plow are traveling in a straight line. Its length is such, however, that when the tractor makes a turn to the left, as in rounding the corner of a field being plowed, the corner plow 24 is lowered to operative position as shown by the dotted lines in Figure 3, by slacking of the member 29 through pivotal movement of the draw bar 7 relative to the tractor 6.

The pivotal movement of the corner plow attachment is permitted by the pivotal attachment of the forward end of its beam 23 to the axle 18. It is obvious that when the plow 24 is in lowered position it will operate to plow the corner portions of a field which cannot ordinarily be operated upon by the plows of the gang.

It is also obvious that when the corner has been completed, the plow 24 will be raised to inoperative position by a straightening out of the tractor hitch and plow frame which thus exert a draft on the flexible member 29. Because of the looseness of this pivotal connection, and the direction of draft through the member 29, the corner plow is caused to tilt or twist as it is raised so that its heel is lifted higher than its point, for clearing the ground. A set collar 35 on the axle 18 serves to limit inward movement of the loop or eye 25.

To assist in maintaining the corner plow in proper position we have provided a brace 34 which preferably is formed from a flat piece of metal fixed at its rear end to the rear portion of the beam 23.

The brace 34 extends laterally and forwardly and is bent between its ends so that its forward portion extends in a plane substantially at right angles to and beneath the adjacent beam 12 as shown in Figure 1. The forward end of the brace 34 passes across the projecting lower end of the standard 26 and is pivoted thereto by a bolt or the like 37. The brace 34 projects beyond its pivot 37 and beneath the plow beam 12 which acts as a stop to limit the downward pivotal movement of the main portion of the brace and to prevent it from passing below a substantially horizontal position when the corner plow moves to operative position.

The flexible connections 10 and 11 of the hitch device may be adjusted to modify and facilitate the action of the corner plow. When the machine is traveling on the road, the members 10 and 11 preferably are adjusted so that both are taut, as in Figure 1, thus preventing relative pivotal movement of the draw bar 7 and cross-head 8.

During the plowing operation, the right hand chain 11 is loosened, as by causing a different link thereof to engage a hook such as 38 on the draw bar 7. In turning a corner to the left, the draw bar 7 may then pivot somewhat relative to the cross-head 8, which action will cause the corner plow 24 to be deflected more to the right from the line of travel, thus swinging farther into the corner.

It is obvious that we have provided a corner plow attachment which is simple, inexpensive and effective in operation. This attachment is held in elevated position and is thus out of the way during such times as the tractor and plow are traveling forwardly in a substantially straight line.

The corner plow assumes an operative position for plowing a corner whenever the tractor makes a substantial turn to the left and is thus effective to facilitate the plowing of corners which cannot ordinarily be accomplished by tractor-drawn gang plows.

It is to be understood that although we have illustrated and described the corner plow attachment as being mounted on the right hand side of the gang plow, yet that other arrangements and methods of mounting and connecting the attachment may be employed if desired.

We claim as our invention:

1. A corner plow attachment for a gang plow drawn by a tractor, comprising a plow beam pivotally mounted at its forward end on the gang plow frame and carrying a corner plow, and a flexible member attached at one end to said plow beam and extending laterally for engagement with a part on the tractor, said flexible member being of such length that the corner plow is held thereby in elevated position while the tractor and gang plow are traveling forwardly and that said corner plow is permitting to move downwardly to operative position while the tractor is turning a corner in one direction.

2. A corner plow attachment for a gang plow drawn by a tractor, comprising a plow beam pivotally mounted at its forward end on the gang plow frame and carrying a corner plow, and a flexible member attached at one end to said plow beam and at its opposite end to the tractor, direction pulleys over which said flexible member is extended, one of said pulleys being offset laterally of a line between the points of connection of said flexible member, said flexible member being of such length that the corner plow is held thereby in elevated position while the tractor and gang plow are traveling forwardly and that said corner plow is permitted to move downwardly to operative position while the tractor is turning a corner in one direction.

3. A corner plow attachment for a gang plow drawn by a tractor, including a draft bar forming a pivotal connection between the tractor and plow, said attachment, comprising a plow beam pivotally mounted at its forward end on the gang plow frame and carrying a corner plow, a brace pivotally connecting said plow beam to the gang plow, and a flexible member attached at one end to said plow beam and extending laterally around a part on the tractor and attached at its opposite end to the draft bar, said flexible member being of such length that the corner plow is held thereby in elevated position while the tractor and gang plow are traveling forwardly and that said corner plow is permitted to move downwardly to operative position while the tractor is turning a corner in one direction.

4. A corner plow attachment for a gang plow drawn by a tractor, including a draft bar forming a pivotal connection between the tractor and plow, said attachment comprising a plow beam pivotally mounted at its forward end on the gang plow frame and carrying a corner plow, means to limit the downward movement of said plow beam, and a flexible member attached at one end to said plow beam and extending laterally around a part on the tractor and attached at its opposite end to the draft bar, said flexible member being of such length that the corner plow is held thereby in elevated position while the tractor and gang plow are traveling forwardly and that said corner plow is permitted to move downwardly to operative position while the tractor is turning a corner in one direction.

5. A corner plow attachment for a gang plow having an axle and a pivoted draft device arranged for movement in a horizontal plane, comprising a plow beam pivotally attached to said axle, a plow bottom carried by said beam, a direction pulley arranged at a point spaced laterally from said draft device, and a flexible member attached to the rear portion of said plow beam, extending around said pulley and attached to said draft device, said flexible member being of such length as to hold said plow bottom in elevated position when said draft device is in position for substantially straight-ahead travel and permitting said plow bottom to be lowered to operative position while the plow is rounding a corner in one direction.

6. A corner plow attachment for a gang plow drawn by a tractor, including a draft bar forming a pivotal connection between the tractor and plow, said attachment comprising a plow beam pivotally mounted at its forward end to said gang plow and carrying a corner plow, a laterally offset direction member on the tractor, and a flexible member attached at one end to said plow beam and extending over said direction member, said flexible member attached at its opposite end to the draft bar, said flexible member being of such length that the corner plow is held thereby in elevated position while the tractor and gang plow are traveling forwardly and that said corner plow is permitted to move downwardly to operative position while the tractor is turning a corner in one direction, the pivotal connection of said plow beam being a loose one to permit the corner plow to be tilted as it is elevated.

7. A corner plow attachment for a gang plow having an axle and a draft device pivoted on a vertical axis, comprising a plow beam pivotally attached to said axle, a plow bottom carried by said beam, a direction pulley arranged at a point spaced laterally from said draft device, a brace fixed at one end to said plow beam and also pivoted to the gang plow, and a flexible member attached to the rear portion of said plow beam, extending around said pulley and attached to said draft device, said flexible member serving to hold said plow bottom in elevated position when said draft device is in position for substantially straight-ahead travel and permitting said plow bottom to be lowered to operative position while the plow is rounding a corner in one direction.

8. A corner plow attachment for a gang plow having an axle and a pivoted draft device arranged for movement in a horizontal plane, comprising a plow beam pivotally attached to said axle, a plow bottom carried by said beam, a direction pulley arranged at a point spaced laterally from said draft device, a brace fixed at one end to said plow beam and also pivoted to the gang plow, one end of said brace being adapted to engage beneath a part of the gang plow to limit downward movement of said plow bottom, and a flexible member attached to the rear portion of said plow beam, extending around said pulley and attached to said draft device, said flexible member serving to hold said plow bottom in elevated position when said draft device is in position for substantially straight-ahead travel and permitting said plow bottom to be lowered to operative position while the plow is rounding a corner in one direction.

Des Moines, Iowa, June 6, 1929.
CLARK EMIL STROBURG.
GLEN ORTA STROBURG.